United States Patent [19]

Hashimura

[11] Patent Number: 6,147,826
[45] Date of Patent: Nov. 14, 2000

[54] MAGNETIC DISK APPARATUS HAVING DUPLICATE SYNC BYTE PATTERNS

[75] Inventor: Yoshihiro Hashimura, Kawasaki, Japan

[73] Assignee: Fujitsu Limited, Kawasaki, Japan

[21] Appl. No.: 08/920,854

[22] Filed: Aug. 29, 1997

[30] Foreign Application Priority Data

Mar. 12, 1997 [JP] Japan .................................. 9-057261

[51] Int. Cl.⁷ .................................................. G11B 5/09
[52] U.S. Cl. .............................. 360/53; 360/46; 360/48; 360/51
[58] Field of Search .................. 360/46, 51, 53, 360/48, 31

[56] References Cited

U.S. PATENT DOCUMENTS

| | | | |
|---|---|---|---|
| 5,422,760 | 6/1995 | Abbott et al. | 360/46 |
| 5,546,243 | 8/1996 | Setoyama | 360/51 |
| 5,604,646 | 2/1997 | Yamawaki | 360/51 |
| 5,696,745 | 12/1997 | Yamawaki | 360/51 |
| 5,844,920 | 12/1998 | Zook et al. | 371/40.14 |
| 5,959,795 | 9/1999 | Wu | 360/78.04 |

FOREIGN PATENT DOCUMENTS

| | | |
|---|---|---|
| 57-147111 | 9/1982 | Japan . |
| 61-026975 | 2/1986 | Japan . |
| 61-206988 | 9/1986 | Japan . |
| 62-112270 | 5/1987 | Japan . |
| 05120802 | 5/1993 | Japan . |

*Primary Examiner*—Paul Loomis
*Assistant Examiner*—Regina Y. Neal
*Attorney, Agent, or Firm*—Greer, Burns & Crain, Ltd.

[57] ABSTRACT

A writing unit writes a first sync byte pattern SB1 to the head of data and writes a second sync byte pattern SB2 to the end of the data (DATA+ECC). When the first sync byte pattern SB1 is not detected, the data is stored into a memory, and after that, a reading unit reads out the second sync byte pattern SB2 in the memory. When the second sync byte pattern SB2 is detected, the reading unit reads out the data of a predetermined length DL in which a position that is preceding to the detecting position by only a predetermined data length (DL) is set to the head position from the memory and demodulates.

13 Claims, 15 Drawing Sheets

FIG. 3A WRITE GATE SIGNAL

FIG. 3B HDC DATA FORMAT

FIG. 3C MEDIUM DATA FORMAT

FIG. 4

| | | PLO | TR | SB 1 | DATA ECC | SB 2 | GAP |
|---|---|---|---|---|---|---|---|
| PATTERN A | HDC IF | "00h" | "93h" | "1Fh" | "XXh" | "69h" | "00h" |
| | MEDIA | "1FFh" S/M | "133h" 8→9 | "18Fh" 8→9 | "XXXh" 8→9 with SC | "009h" 8→9 | "1FFh" S/M |
| PATTERN B | HDC IF | "00h" | "FFh" | "FFh" | "XXh" | "FFh" | "00h" |
| | MEDIA | "1FFh" S/M | "133h" S/M | "18Fh" S/M | "XXXh" 8→9 with SC | "009h" S/M | "1FFh" S/M |
| DATA LENGTH | | 5~30B | 0~5B | 1B | XX | 1B | XX |

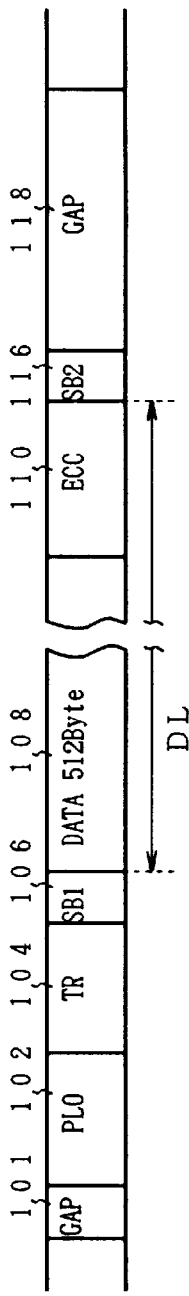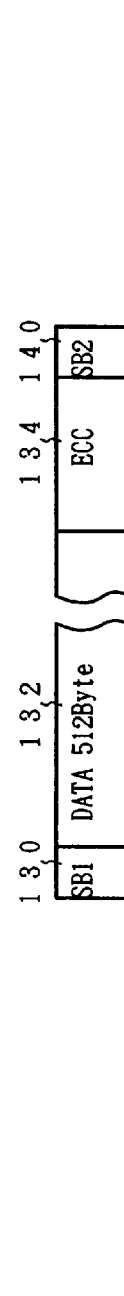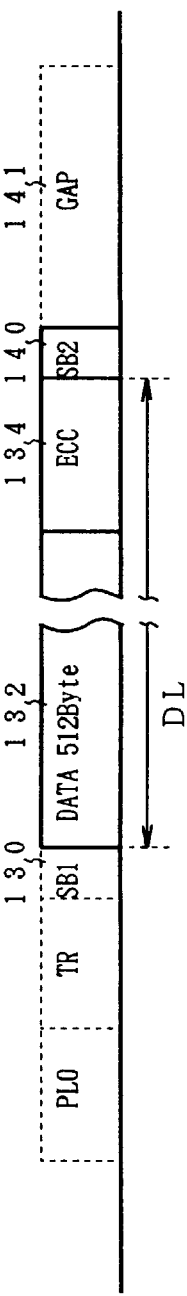
FIG. 6A MEDIUM DATA FORMAT
FIG. 6B READ GATE SIGNAL
FIG. 6C READ DATA AT THE TIME OF NORMAL
FIG. 6D READ DATA WHEN SB1 IS LOST

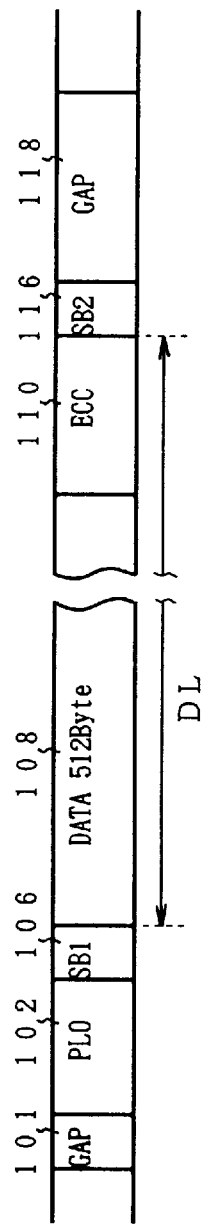
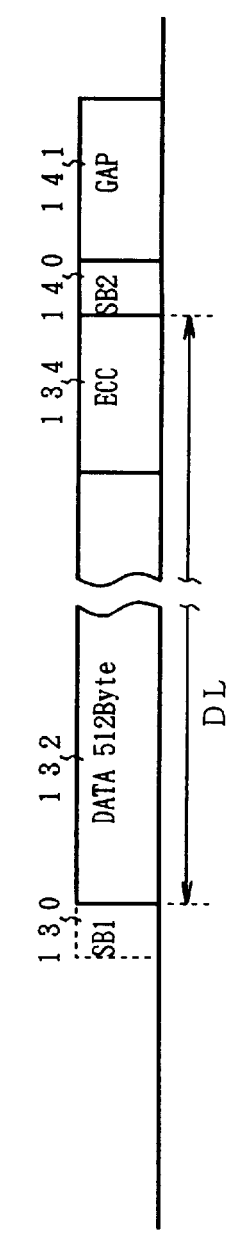
FIG. 8A MEDIUM DATA FORMAT
FIG. 8B READ GATE SIGNAL
FIG. 8C READ DATA AT THE TIME OF NORMAL
FIG. 8D READ DATA WHEN SB1 IS LOST

F I G. 9

|  |  | PLO | SB | DATA ECC | SB 2 | GAP |
|---|---|---|---|---|---|---|
| PATTERN C | HDC IF | "00h" | "FFh" | "XXh" | "EEh" | "00h" |
|  | MEDIA | "1FFh" S/M | "067h" S/M | "XXXh" 8->9 with SC | "133h" S/M | "1FFh" S/M |
| DATA LENGTH |  | 5~30B | 1~6B | 0~XXB | 1~6B | — |

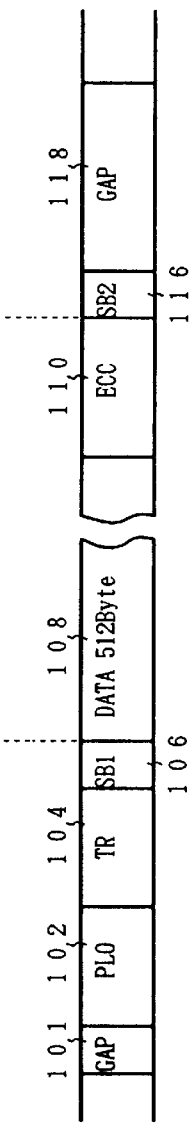
FIG. 13A WRITE GATE SIGNAL
FIG. 13B HDC DATA FORMAT
FIG. 13C TIMING SIGNAL
FIG. 13D SCRAMBLING SIGNAL
FIG. 13E MEDIUM DATA FORMAT

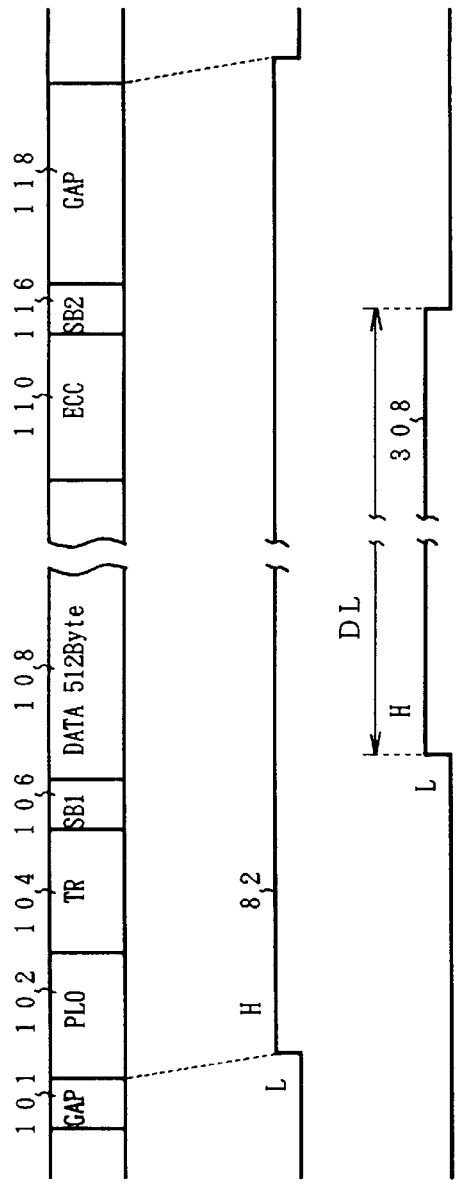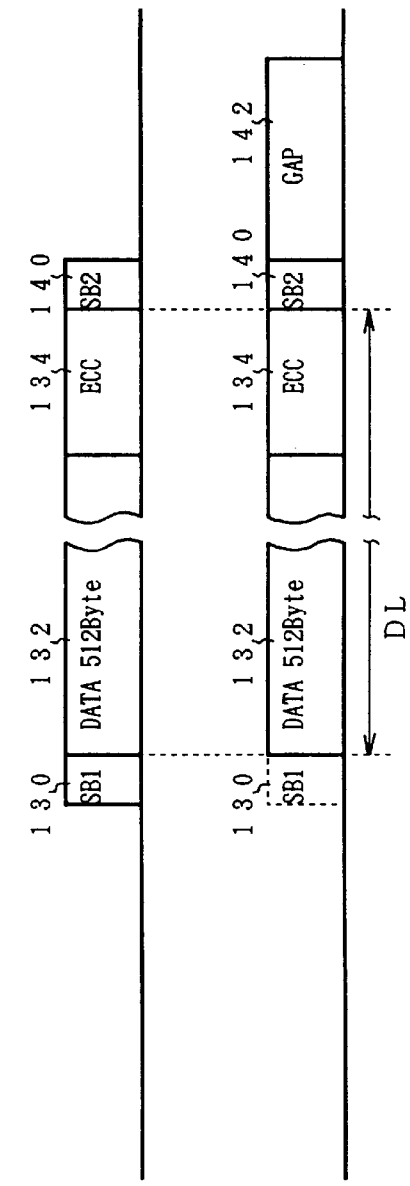

MAGNETIC DISK APPARATUS HAVING DUPLICATE SYNC BYTE PATTERNS

BACKGROUND OF THE INVENTION

The invention relates to a magnetic disk apparatus for reading medium information by an MR head and, more particularly, to a magnetic disk apparatus which can properly recover in the case where a sync byte pattern at the head of a sector is lost by a thermal asperity in which a read signal suddenly fluctuates by a collision heat generation when an MR head comes into contact with a medium.

In recent years, in association with an increase in capacity of a magnetic disk apparatus as an external storage device of a computer, a magnetic head of a high performance is needed. As a magnetic head satisfying the need, attention is paid to a magnetic disk apparatus having what is called an MR head using a magneto-resistive element which can obtain a high reproduction output without depending on a peripheral velocity of a recording medium. In the magnetic disk apparatus using such an MR head as a read head, however, when the MR head collides with a physical convex or concave portion due to an extremely slight dent, a deformation, or the like on the surface of the medium which is rotating, a temperature of the MR head rises instantaneously by a friction heat. When the temperature of the MR head rapidly rises by the contact with the thermal fluctuation concave and convex portions of the medium as mentioned above, a base line of a read signal is shifted, and a read error which cannot be recovered occurs. This state is seemingly the same as that a medium defect exists. The phenomenon in which the read error occurs by the collision heat generation of the MR head with the medium is usually called a thermal asperity. That is, when a state in which a sync byte pattern cannot be read by the thermal asperity of the MR head occurs in a sync byte region in a read sector on a medium track, sector data cannot be demodulated at all. In this case, although the reading operation is executed again, since the thermal fluctuation concave and convex portions are kind of physical defects, the same reading impossible state repetitively occurs in the same sync byte region and an unrecoverable read error is caused. For a high density recording of the medium, it is necessary to reduce a floating height of the MR head and this results in a factor of an increase in number of times of occurrence of the defect due to the thermal asperity of the MR head. As a rotational speed of the medium increases, when the thermal asperity of the MR head occurs, the shift of the base line of the read signal further increases. Further, every possible is performed on the magnetic disk apparatus at the factory. The defect caused by the thermal asperity of the MR head is, however, a problem occurring during the use by the user. Further, since there is a tendency such that the defect grows while the user is using the apparatus, there is a fear that the performance of the magnetic disk apparatus remarkably deteriorates.

SUMMARY OF THE INVENTION

According to the invention, there are provided a magnetic disk apparatus and a magnetic disk medium which can realize a strong recovery for a defect caused by a thermal asperity of an MR head in a sync byte region.

It is an object of the invention to provide a magnetic disk apparatus for writing and reading information to/from tracks of a medium on a sector unit basis by using a combination head having an inductive head for writing and an MR head for reading.

(Basic Sector Format)

When data DATA including an error detection correction code ECC is written into a sector region of the medium, a writing unit (write channel) of a magnetic disk apparatus of the invention writes a first sync byte pattern SB1 to the head of the data and also writes a second sync byte pattern SB2 to the end of the data. When the sector region is read out, if the first sync byte pattern SB1 is normally detected, a reading unit (read channel) demodulates the data in the ordinary manner. When the first sync byte pattern SB1 is not detected, on the other hand, code word recorded on the medium, namely, in the case where the data has been 8/9 converted and recorded, the serial data of nine bits is continuously stored into a memory on a bit unit basis. The data storage to the memory can be started for an interval during which a read gate is ON or can be also started at a timing of a predetermined number of bits from the elapse of a predetermined time after the read gate had been turned on. At any timing, it is necessary that the second sync byte pattern SB2 and a gap pattern of a few bytes are included in the data stored in the memory. When the data is fetched into the memory by the code word recorded on the medium, the data is read back from the gap side on the contrary and the second sync byte pattern SB2 is detected. It is now assumed that the gap pattern is expressed by a 9-bit code word of "1FFh (111111111)" and the second sync byte pattern SB2 is expressed by "0D9h (011011001)". In this case, serial data

"111111111100110110XXX"

is checked by the back reading operation by comparing in a bit-to-bit corresponding manner and "100110110" is detected, namely, detecting "136h" opposite to "0D9h" is detected, so that the second sync byte pattern SB2 can be detected. By the detection of the second sync byte pattern SB2, a byte boundary is applied to a serial data train and the data is read out from a position that is preceding by DL bytes indicative of (data length)+(ECC length)

and the 8/9 conversion and a descrambling process for the data and ECC are executed, so that the data can be demodulated. The demodulation data in this case is based on a condition such that there is a defect in the first sync byte pattern SB1 as a prerequisite. Therefore, it will be obviously understood that it is usually necessary to further correct the data by the ECC. A point that a Hamming distance when the data is read back and the second sync byte pattern SB2 and the gap pattern are data compared on a bit unit basis is large becomes a condition for making it possible to easily detect the second sync byte pattern SB2. When the gap pattern is set to "1FFh", therefore, the second sync byte pattern SB2 may be any pattern so long as it includes three or more "0". Further, when the first sync byte pattern SB1 is equal to "18Fh (110001111)", in order to share a sync byte detector, it is also considered to use a reverse pattern like "1E3h (111100011)" as a second sync byte pattern SB2.

The writing unit writes a training pattern for automatically adjusting circuit constants (tap coefficients and the like of a transversal filter) of an automatic equalizer provided for the reading unit to optimum values to a position before each of the first and second sync byte patterns SB1 and SB2. The writing unit writes a pilot pattern for synchronizing a clock generating circuit provided for the reading unit with a read signal to a position before the first sync byte pattern SB1. Further, the writing unit has a scrambling circuit for scrambling each of the data and ECC (error detection correction code) which are written to the medium by using a predetermined pseudo random code. It is necessary to turn off the scrambling operation for the second sync byte pattern SB2 and gap pattern. In correspondence to it, the reading unit has a descrambling circuit for descrambling each of the data and ECC read out from the medium by using the pseudo random code. The reading unit executes the reading process again when both of the first and second sync byte patterns SB1 and SB2 cannot be detected. When the first sync byte pattern SB1 cannot be detected, after the reading process was normally finished, the reading unit determines that the read sector is a defective sector, so that the reading unit executes an alternating process. Therefore, even if a defective sector such that the sync byte pattern is lost due to the thermal asperity of the MR head occurs during the use by the user, the defect is eliminated by the alternating process and a growth of the defect during the use by the user can be substantially suppressed.

[Data Split]

When a servo region has previously been recorded in the middle of the sector region of the medium on which data is written, the writing unit splits the sector region into two regions of a first sector region before the servo region and a second sector region after the servo region and splits the write data into two data of first split data (data length DL1) of the first sector region and second split data (data length DL2) of the second sector region. The first sync byte pattern SB1, first split data, and second sync byte pattern data SB2 are sequentially written into the first sector region. Subsequently, the first sync byte pattern SB1, second split data, and second sync byte pattern SB2 are sequentially written into the second sector region. When the first or second sector region is read out, if the first sync byte pattern SB1 is detected, the reading unit demodulates each of the split data. On the other hand, when the first sync byte pattern SB1 is not detected, the first split data in the first sector region, second sync byte pattern SB2, and gap pattern are recorded into a memory on a bit serial unit basis of a code word. Subsequently, the second split data in the second sector region, ECC, second sync byte pattern SB2, and gap pattern are recorded into the memory on a bit serial unit basis of the code word. After the recording, they are sequentially read back from the gap pattern and the second sync byte pattern SB2 is searched. When the second sync byte pattern SB2 can be detected, a byte boundary is set and a position of a data length given by DL1 or DL2 is specified. The data is read out from this portion and is decoded and descrambled and, further, the data is corrected by the ECC, so that the data which cannot be read by the ordinary reading method can be reconstructed. With respect to this data split, a training pattern for automatic equalization, a training pattern for clock synchronization, and the gap pattern are written as necessary to positions before the first sync byte pattern SB1. Further, the scrambling and descrambling processes, the retrying process when both of the first and second sync byte patterns SB1 and SB2 are lost, and the alternating process when the first sync byte pattern SB1 in the first or second sector region cannot be detected are also similarly executed.

[Disk Medium]

Further, the invention provides a magnetic disk medium in which information is written and read out onto/from tracks on a sector unit basis by using a combination head having an inductive head for writing and an MR head for reading. In the sector region of the medium, the first sync byte pattern SB1 is written to the head of the data including the ECC and the second sync byte pattern SB2 is also written to the end of the data. A training pattern for automatically adjust a circuit constant of an automatic equalizer provided for the reading unit to an optimum value is written as necessary to a position before the first sync byte pattern SB1. The pilot pattern for synchronizing a clock generating circuit provided for the reading unit with a read signal is written to a position before the first sync byte pattern SB1. Further, the data including the ECC is scrambled by a predetermined pseudo random code and is written. In the case where the servo region is located in the middle of the sector region on the medium track and is split to two regions of the first sector region and the second sector region, with respect to the data split of the disk medium as well, the training pattern for automatic equalization and the training pattern for clock synchronization are written as necessary to a position before the first sync byte pattern SB1. The scrambling and descrambling processes, the retrying process when both of the first and second sync byte patterns SB1 and SB2 are lost, and the alternating process when the first sync byte pattern SB1 in the first or second sector region cannot be detected are also similarly executed.

The above and other objects, features, and advantages of the present invention will become more apparent from the following detailed description with reference to the drawings.

BRIEF DESCRIPTION OF THE DRAWINGS

FIG. 4 is an explanatory diagram of using patterns of the HDC data format and medium data format in FIG. 3;

FIGS. 6A to 6D show the medium data format and time charts at the times of a normal reading process and a loss of SB1 in the reading process in FIGS. 3A to 3C;

FIGS. 8A to 8D show a medium data format of the invention without training and time charts at the time of normal and loss of SB1 in the reading process;

FIG. 9 is an explanatory diagram of a using pattern of the medium data format without training;

FIGS. 13A to 13E are time charts for the scrambling operation in FIG. 12;

FIGS. 15A to 15F are time charts for the descrambling operation in FIG. 14 at the time of normal and loss of SB1.

DETAILED DESCRIPTION OF THE PREFERRED EMBODIMENT

[Apparatus Construction and Fundamental Format]

Figure 1:
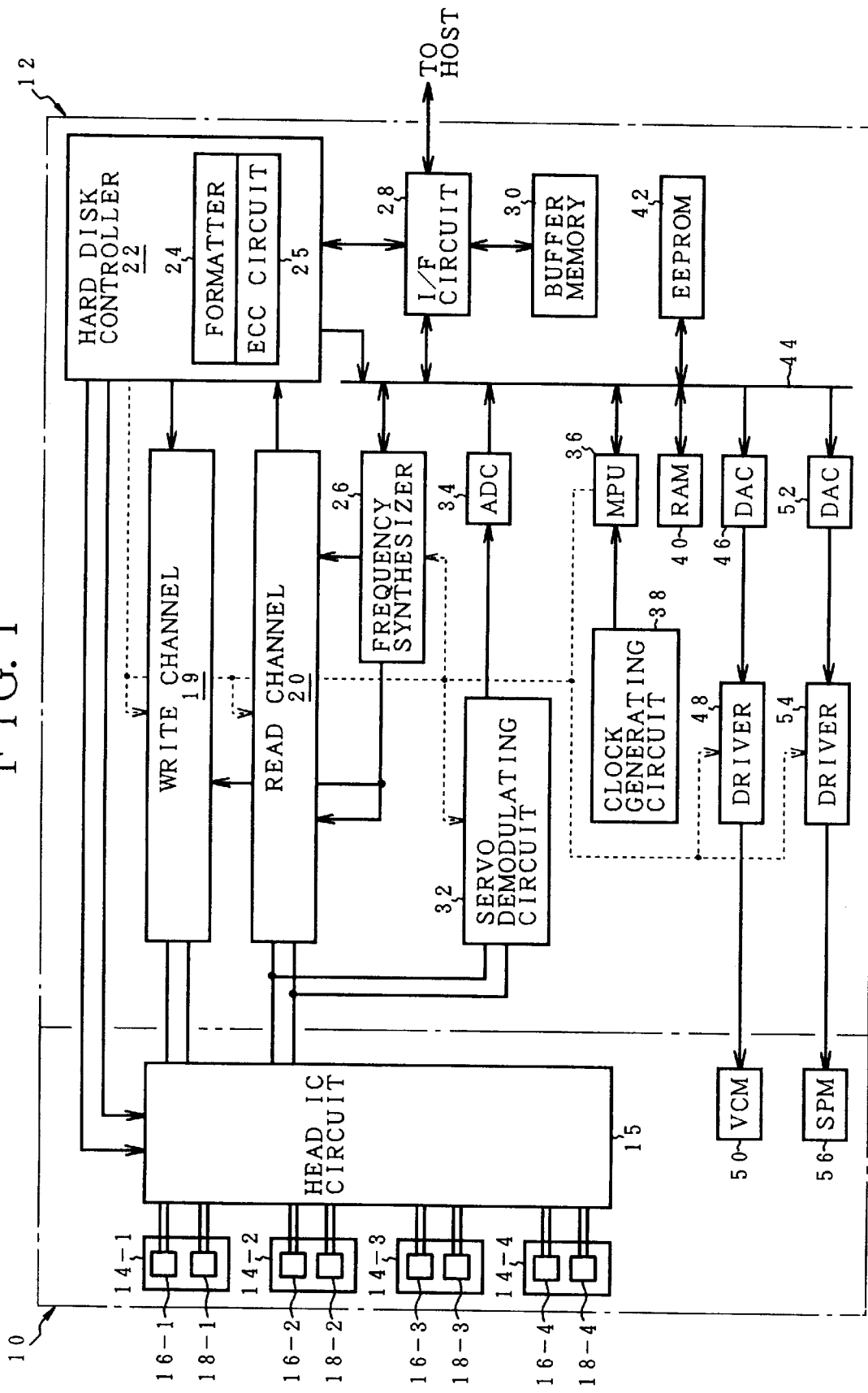
FIG. 1 is a block diagram of an embodiment of an apparatus construction of the invention.

FIG. 1 is a block diagram of a magnetic disk apparatus of the invention. The magnetic disk apparatus known as a hard disk drive (HDD) is made up of a disk enclosure 10 and a disk controller 12. A head IC circuit 15 is provided for the disk enclosure 10 and, in the embodiment, four combination heads 14-1 to 14-4 are connected to the head IC circuit. The combination heads 14-1 to 14-4 integratedly have inductive heads 16-1 to 16-4 functioning as writing heads and MR heads 18-1 to 18-4 functioning as reading heads. A VCM 50 to drive a head actuator and a spindle motor 56 to rotate the disk medium are provided for the disk enclosure 10. For the head IC circuit 15 of the disk enclosure 10, a write channel (WRC) 19 and a read channel (RDC) 20 are provided on the disk controller 12 side. A hard disk controller (HDC) 22 is provided for the write channel 19 and read channel 20. A formatter 24 and an ECC circuit 25 are built in the hard disk controller 22. The hard disk controller 22 is connected to an interface circuit 28 and executes a supply of write data from the host side and a transfer of read data to/from the host side by a data transfer to the upper host side by the interface circuit 28. A buffer memory 30 which is used for data transmission on the host side is provided for the interface circuit 28. A servo demodulating circuit 32 is provided for a head positioning control at the time of reading and writing for the disk medium. In the embodiment, since a constant density recording (CDR) is used with respect to the disk medium, a cylinder of the disk medium is divided into zones every predetermined number of cylinders and a different frequency has been preset every zone. For this purpose, a frequency synthesizer 26 is provided. By setting a corresponding zone frequency from a cylinder address at the time of the reading operation or writing operation, clocks are supplied to the write channel 19 and read channel 20. An MPU 36 performs a whole control of the disk controller 12. An RAM 40 is connected to the MPU 36 through a bus 44 and, further, an EEPROM 42 is connected as a non-volatile memory. Since the interface circuit 28 is connected to the MPU 36 through the bus 44, the MPU 36 receives various commands from the host and decodes them and executes a reading/writing instruction for the hard disk controller 22 and a head positioning control by the driving of the VCM 50 provided for the disk enclosure 10. In order to drive the VCM 50, a D/A converter 46 and a driver 48 are provided for the bus 44 and control the VCM 50 by an instruction of the MPU 36. The spindle motor 56 is also driven by a D/A converter 52 and a driver 54. A position signal for the head positioning control by the MPU 36 is derived from the servo demodulating circuit 32 and A/D converter 34.

Figure 2:
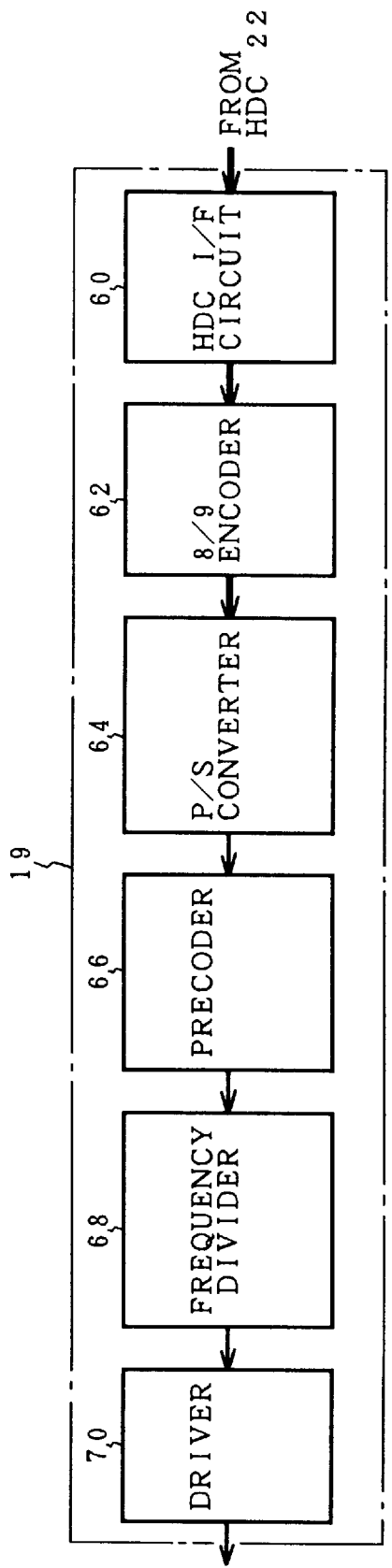
FIG. 2 is a block diagram of a write channel in FIG. 1.

FIG. 2 is a block diagram of the write channel 19 in FIG. 1. The write channel 19 is constructed by an HDC interface circuit 60 for writing, an 8/9 encoder 62, a parallel/serial converter 64, a precoder 66, a frequency divider 68, and a driver 70. That is, the write data formatted by the formatter 24 provided for the hard disk controller 22 in FIG. 1 is supplied from the HDC interface circuit 60 for writing to the 8/9 encoder 62. After NR reset write data was converted into, for example, an 8/9 code, it is converted into serial data by the parallel/serial converter 64. After the precoder 66 performed a preceding of $1/(1+D)^m$ for a partial response maximum likelihood detection on the read channel 20 side, a write compensation is performed and a resultant output signal of the precoder 66 is frequency divided by the frequency divider 68. After that, a resultant output signal of the frequency divider is supplied to the writing head selected at that time through the head IC circuit 15 in FIG. 2 by the driver 70 and is written to the disk medium.

Figure 3:
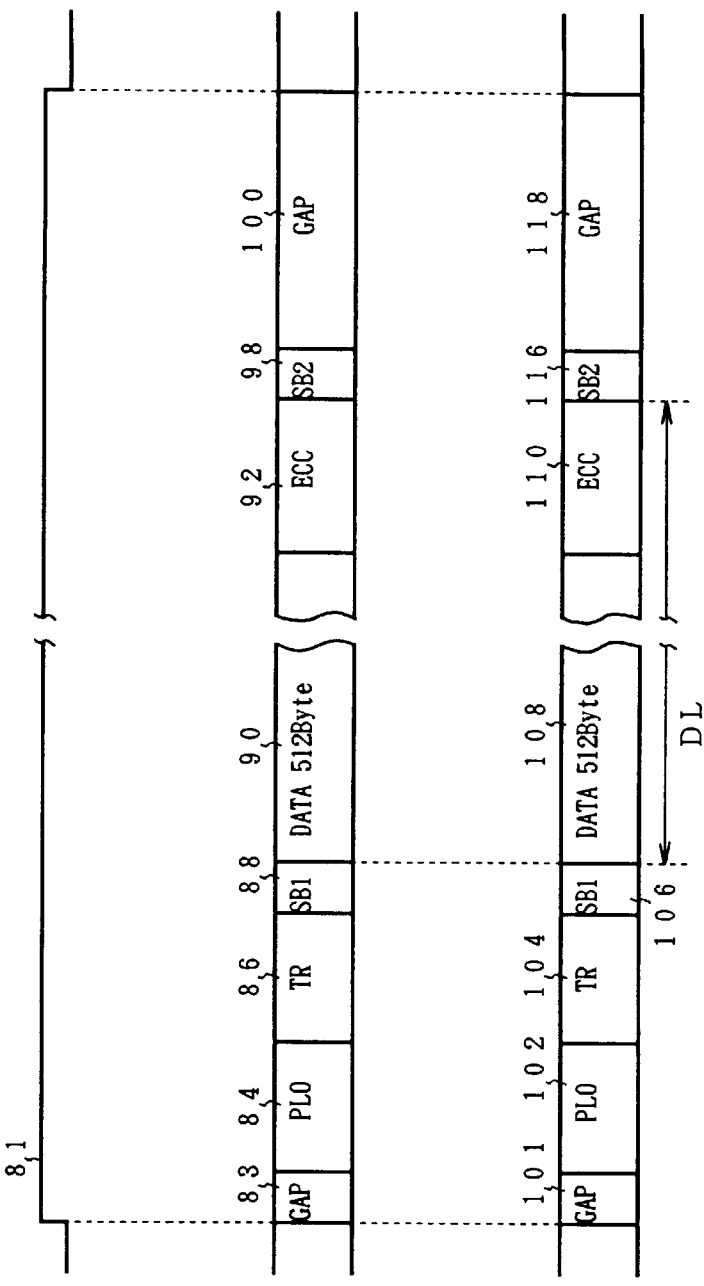
FIGS. 3A to 3C are time charts for an HDC data format and a medium data format for a writing process in the invention.
Figure 5:
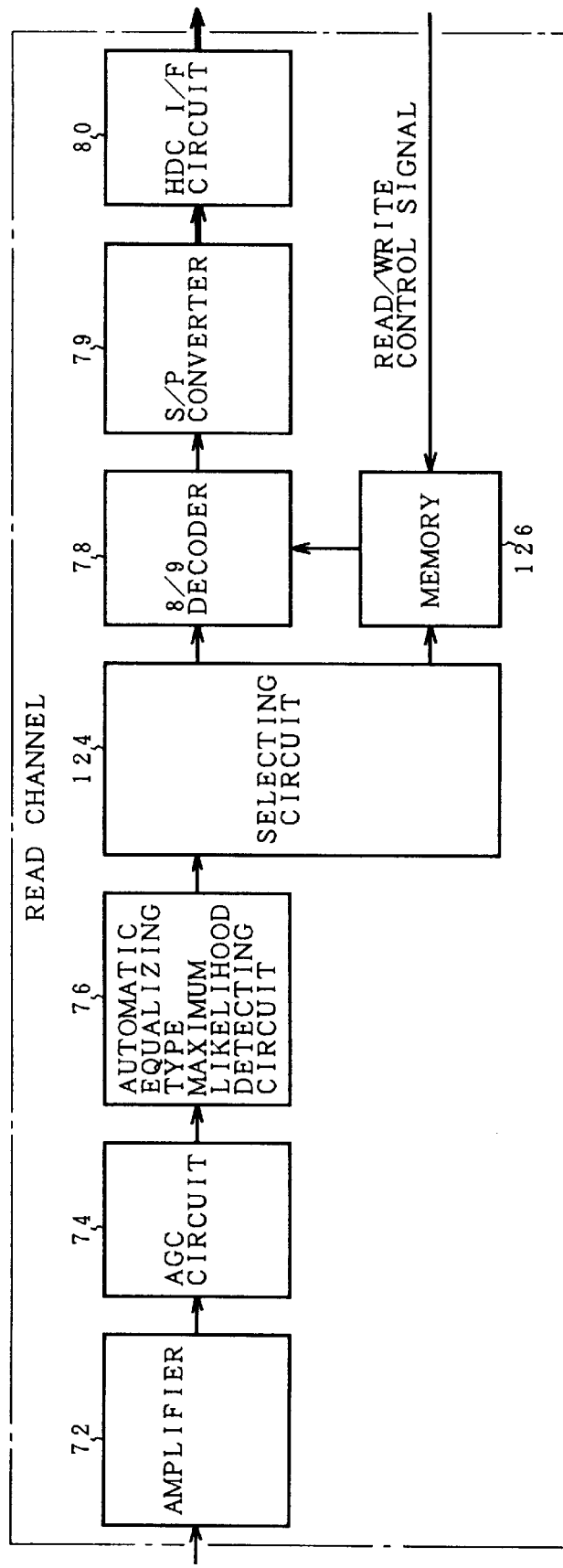
FIG. 5 is a block diagram of a read channel in FIG. 1.

FIGS. 3A to 3C show an HDC data format and a medium data format when writing to the disk medium by the hard disk controller 22 and write channel 19 in FIG. 1 and time charts for a write gate signal. A write gate signal 81 in FIG. 3A is generated for a period of time of a sector format on the disk medium by the hard disk controller 22. Synchronously with the write gate signal 81, as shown in the HDC data format in FIG. 3B, the data format formatted by the formatter 24 provided for the hard disk controller 22 in FIG. 1 is supplied to the write channel 19. That is, the HDC data format in FIG. 3B is a format of data which is received from the hard disk controller 22 by the HDC interface circuit 60 for writing in FIG. 2. According to the HDC data format, subsequent to a gap pattern 83 shown by GAP at the head of the sector, a pilot pattern 84 shown by PL0 is provided as a preamble. Subsequent to the pilot pattern 84, a training pattern 86 shown by TR to perform the training of a maximum likelihood detecting circuit 76 of the automatic equalizing type of the read channel 20 in FIG. 5 is provided. After that, a first sync byte pattern 88 shown by SB1 is provided and data 90 shown by DATA as a data portion and an error detection correction code 92 shown by ECC are provided. A format until here is an ordinary sector format. Further, in the invention, a second sync byte pattern 98 shown by SB2 is provided at the end of the data portion in order to recover errors by thermal asperity of the MR head.

In correspondence with the HDC data format in FIG. 3B, the medium data format which is written to the disk medium through the IC head 15 by the write channel 19 in FIG. 1 has a format construction of a gap field 101, a pilot field 102, a training field 104, a first sync byte field 106, a data field 108, an ECC field 110, a second sync byte field 116, and a gap field 118 from the head as shown in FIG. 3C. For the first sync byte pattern 88 at the head of the data portion as mentioned above, since a second sync byte pattern 98 is newly provided at the end of the data portion, a situation such that the read data is lost by thermal asperity of the MR head and the sector reading operation enters a recovery impossible state can be prevented. That is, in the case where a contact with the disk medium occurs by thermal asperity of the MR head in the first sync byte field 106 in the medium data format in FIG. 3C and the read data enters an unreproducible state and is lost, the second sync byte pattern SB2 of the second sync byte field 116 provided at the end of the data portion is detected. The detection of the second sync byte pattern SB2 in the case where the first sync byte pattern SB1 is not detected is performed as follows. First, the code word recorded on the medium, namely, in the case where the data has been 8/9 converted and recorded, the serial data of nine bits is continuously stored into the memory on a bit unit basis. The storage to the memory can be started during an interval when a read gate is ON or at a timing of a predetermined number of bits after the elapse of a predetermined time after the read gate had been turned on. In any of the above timings, it is necessary that the second sync byte pattern SB2 and the gap pattern of a few bytes are included in the data stored in the memory. When the data is stored into the memory by the code word recorded on the medium, the data is now read back from the gap side, thereby detecting the second sync byte pattern SB2. It is now assumed that the gap pattern GAP is expressed by a 9-bit code word of "1FFh (111111111)" and the second sync byte pattern SB2 is expressed by "0D9h (011011001)". In this case, the serial data

"1111111111100110110XXX"

is checked on a bit unit basis by the back reading operation and "100110110" is detected, namely, "136h" opposite to "0D9h" is detected, so that the second sync byte pattern SB2 can be detected. By the detection of the second sync byte pattern SB2, a byte boundary is given to the serial data train and the data is read out from the position that is preceding by DL bytes indicative of (data length)+(ECC length)

By performing the 8/9 conversion and the descrambling operation to the data and ECC, the data can be demodulated. The demodulation data in this case is based on a condition such that there is a defect in the first sync byte pattern SB1 as a prerequisite. Therefore, the data correction is ordinarily further performed by the ECC. A point that a Hamming distance when the data is read back and the second sync byte pattern SB2 and gap pattern GAP are data compared on a bit unit basis is large becomes a condition for making it possible to easily detect the second sync byte pattern SB2. Therefore, when the gap pattern is equal to "1FFh", any pattern can be used as a second sync byte pattern SB2 so long as it includes three or more "0". Further, when the first sync byte pattern SB1 is equal to "18Fh (110001111)", in order to share the sync byte detector, a method of using a reverse pattern like "1E3h (111100011)" as a second sync byte pattern SB2 is also considered.

FIG. 4 shows specific patterns in the HDC data format in FIG. 3B and the medium data format in FIG. 3C and specific examples of a data length. Two kinds of pattern A and pattern B are shown here as data patterns. The HDC data format in FIG. 3B is shown as "HDCIF" and the medium data format in FIG. 3C is shown as "MEDIA (medium)", respectively. That is, the data pattern of "HDCIF" indicative of the HDC data format is data from the hard disk controller 22 for the HDC interface circuit 60 for writing in FIG. 2 and is data before the conversion by the 8/9 encoder 62. On the other hand, the pattern of "MEDIA" as a medium data format of FIG. 4 is a pattern after it was converted by the 8/9 encoder 62 in FIG. 2. Further, with respect to the data DATA of "MEDIA" as a medium data format and the ECC, it means that a scrambling process SC has been performed. The pilot pattern PL0, first sync byte pattern SB1, second sync byte pattern SB2, and gap pattern GAP are not scrambled. A pattern B in FIG. 4 is the same as a pattern A with respect to "HDCIF" indicative of the HD data format. However, with regard to the pilot pattern PL0, training pattern TR, first sync byte pattern SB1, and second sync byte pattern SB2, the pattern B differs from a point that it is converted into a predetermined pattern by a state machine instead of the 8/9 encoder. Further, as for the data length, each of the first sync byte pattern SB1 and the second sync byte pattern SB2 consists of one byte in a manner similar to the conventional sync byte pattern. Each of the data DATA and the ECC subsequent to the first sync byte pattern SB1 consists of, for instance, 512 bytes. The pilot pattern PL0 consists of 5 to 30 bytes. The training pattern TR consists of 0 to 5 bytes.

FIG. 5 is a block diagram of the read channel 20 in FIG. 1. The read channel 20 is constructed by an amplifier 72, an AGC circuit 74, the automatic equalizing type maximum likelihood detecting circuit 76, an 8/9 decoder 78, a serial/parallel converter 79, and an HDC interface circuit 80 for reading. The amplifier 72 amplifies a read signal derived through the head IC circuit 15 in FIG. 1. The signal is amplified by an automatic gain control by the AGC circuit 74. After that, a partial response maximum likelihood detection, for example, a process of PR4LM or EPR4LM is executed by the automatic equalizing type maximum likelihood detecting circuit 76. In the maximum likelihood detection by the partial response, ordinarily, an automatic equalizer using a transversal filter is provided before the maximum likelihood detecting circuit. As a method of setting tap coefficients of the transversal filter as an automatic equalizer, there are two types of a fixed equalizing type in which the tap coefficients have preliminarily fixedly set at the time of shipping from a factory and an automatic equalizing type in which the tap coefficients are automatically adjusted by using the training signal recorded in the sector format of the disk medium. The 8/9 decoder 78 demodulates the encoding data which was code converted by the 8/9 encoder 62 on the write channel 19 side into original NRZ data. The demodulation data from the 8/9 decoder 78 is converted into parallel data by the serial/parallel converter 79 and is outputted to the hard disk controller 22 in FIG. 1 through the HDC interface circuit 80 for reading. Further, in order to recover an error in the case where the sync byte pattern is lost by thermal asperity of the MR head, a selecting circuit 124 and a memory 126 are provided between the automatic equalizing type maximum likelihood detecting circuit 76 and 8/9 decoder 78. When the read gate signal is turned on, the selecting circuit 124 supplies read data from the automatic equalizing type maximum likelihood detecting circuit 76 to the 8/9 decoder 78. At the same time, the selecting circuit 124 supplies the data from the automatic equalizing type maximum likelihood detecting circuit 76 to the memory 126. The writing and reading operations of the memory 126 are executed by write/read control signals from the hard disk controller 22. The writing operation of the serial bit data to the memory 126 is executed for an interval, for example, during which the read gate signal from the hard disk controller 22 is ON. Therefore, the data, ECC, second sync byte pattern SB2, and gap pattern of a few bytes are certainly stored in the memory 126. When the first sync byte pattern SB1 is not detected, the data in the memory 126 is read back from the gap side, thereby detecting the second sync byte pattern SB2. When the second sync byte pattern SB2 can be detected, the byte boundary is given to the serial data train. The data is read out from the location in the memory 126 that is preceding by DL bytes indicative of a data length DL in which the data length and the ECC length are added. The read data is 8/9 converted by the 8/9 decoder 78. After that, the converted data is transferred to the hard disk controller through the serial/parallel converter 78 and HDC interface circuit 80. When the data has been scrambled at the time of writing to the medium, the descrambling process is performed to the data and ECC and the data is demodulated.

FIGS. 6A to 6D show the medium data format written as shown in FIG. 3C and time charts for the reading process. FIG. 6A shows the medium data format of one sector and each field is the same as that in FIG. 3C. WS (Write Splice) in FIG. 6A denotes a boundary of a sector rewriting region. When the reading operation using the MR head for the medium data format in FIG. 6A is executed, a read gate signal 82 as shown in FIG. 6B is turned on to the H level from the portion of the pilot pattern PL0 from the hard disk controller 22. In the ordinary reading operation, after the first sync byte pattern SB1 was detected, the data DATA and the ECC are demodulated. After that, the read gate signal 82 is turned off to the L level. FIG. 6C shows read data when the medium data format in FIG. 6A is normally read. In association with the turn-on to the H level of the read gate signal 82, the read data of the pilot pattern PLO and training pattern TR are obtained. However, they are used for clock synchronization in data PLL existing in the read channel 20 in FIG. 1. As an output to the hard disk controller 22 of the read channel 20, the data is merely transmitted as specified data "00h". Subsequently, read data 130 of the sync byte pattern SB1 is normally obtained and the NRZ data is demodulated by the 8/9 decoder 78 from read data 132 of the DATA and read data 134 of the ECC. FIG. 6D shows a case where the read data 130 of the first sync byte pattern SB1 is lost by thermal asperity of the MR head. As for the data PLL existing in the hard disk controller 22 in FIG. 1, the synchronization with the signal of the pilot pattern PLO is started and the pull-in is completed before the training pattern TR is detected. When the pull-in is completed, the serial data demodulated by the maximum likelihood detecting circuit 76 is sequentially recorded into the memory 126 in FIG. 5. This operation is continued until the hard disk controller 22 turns off the read gate. The hard disk controller 22 turns on the read gate signal 82 while including the portion of the gap pattern GAP. After the read gate signal 82 was turned off, the hard disk controller 22 compares the bits from the reverse direction of the writing direction into the memory 126, thereby detecting the second sync byte pattern SB2 subsequent to the gap pattern GAP. When the second sync byte pattern SB2 can be detected, the reading position is shifted to a position that is preceding by only the number of DL bytes in accordance with the DL length as a sum of the data length and the ECC length. The data within a range from the data at that position to the ECC is read out and is subjected to the 8/9 conversion by the 8/9 decoder 78 and the descrambling process and, further, the ECC circuit 25 is made operative. Thus, even if the first sync byte pattern SB1 cannot be demodulated, the data is demodulated and the reading operation can be normally finished. Since the loss by thermal asperity of the MR head lies within a range of about a few bytes, there is a case where the head portion of the data DATA is also lost subsequently to the loss of the first sync byte pattern SB1. As mentioned above, even if the loss due to thermal asperity of the MR head occurs also in the head portion of the read data 132 of the data DATA, so long as it is a data loss within a range of the correcting ability by the error detection correction code, the portion of the lost data can be reconstructed in the ECC circuit 25 provided for the hard disk controller 22 in FIG. 1. In the embodiment, since the correcting ability of the ECC circuit 25 provided for the hard disk controller 22 in FIG. 1 is set to tens of bytes, the data can be sufficiently corrected. Further, when the read data of both of the first sync byte pattern SB1 and second sync byte pattern SB2 cannot be detected, since the data cannot be demodulated at all, the reading operation is again executed as a retrying process. The retrying process is repetitively performed only a predetermined number of retrying times until the data demodulation can normally be performed by the detection of the second sync byte pattern SB2. Ordinarily, since the loss due to thermal asperity of the MR head lies within about tens of bytes, even if the first sync byte pattern SB1 is lost, the loss doesn't exert an influence on the second sync byte pattern SB2 locating at the end of the data portion. Therefore, the loss of the second sync byte pattern SB2 subsequent to the loss of the first sync byte pattern SB1 can be regarded as a data loss due to a cause other than thermal asperity of the MR head. Thus, by the rereading operation at the time of retry, read data 140 of the second sync byte pattern SB2 is certainly derived as shown in FIG. 6D, the data DATA and the ECC are correctly read out from the memory 126 and are demodulated, and the reading operation can be normally finished. Further, with respect to the retry when the first sync byte pattern SB1 in FIG. 6D is lost or both of the first sync byte pattern SB1 and second sync byte pattern SB2 are lost, after the reading operation was normally finished, the sector is regarded as a defective sector and the sector data is stored into an empty sector of a predetermined alternating cylinder of the disk medium and is registered into a sector alternating table on the controller. Therefore, after that, in response to an access to the same defective sector, an access is performed to the alternating sector on the basis of the contents in the alternating table. Therefore, the sector in which the loss due to thermal asperity of the MR head has once occurred is eliminated from access target sectors, so that a growth of the defective sector due to thermal asperity of the MR head can be prevented.

Figure 7:
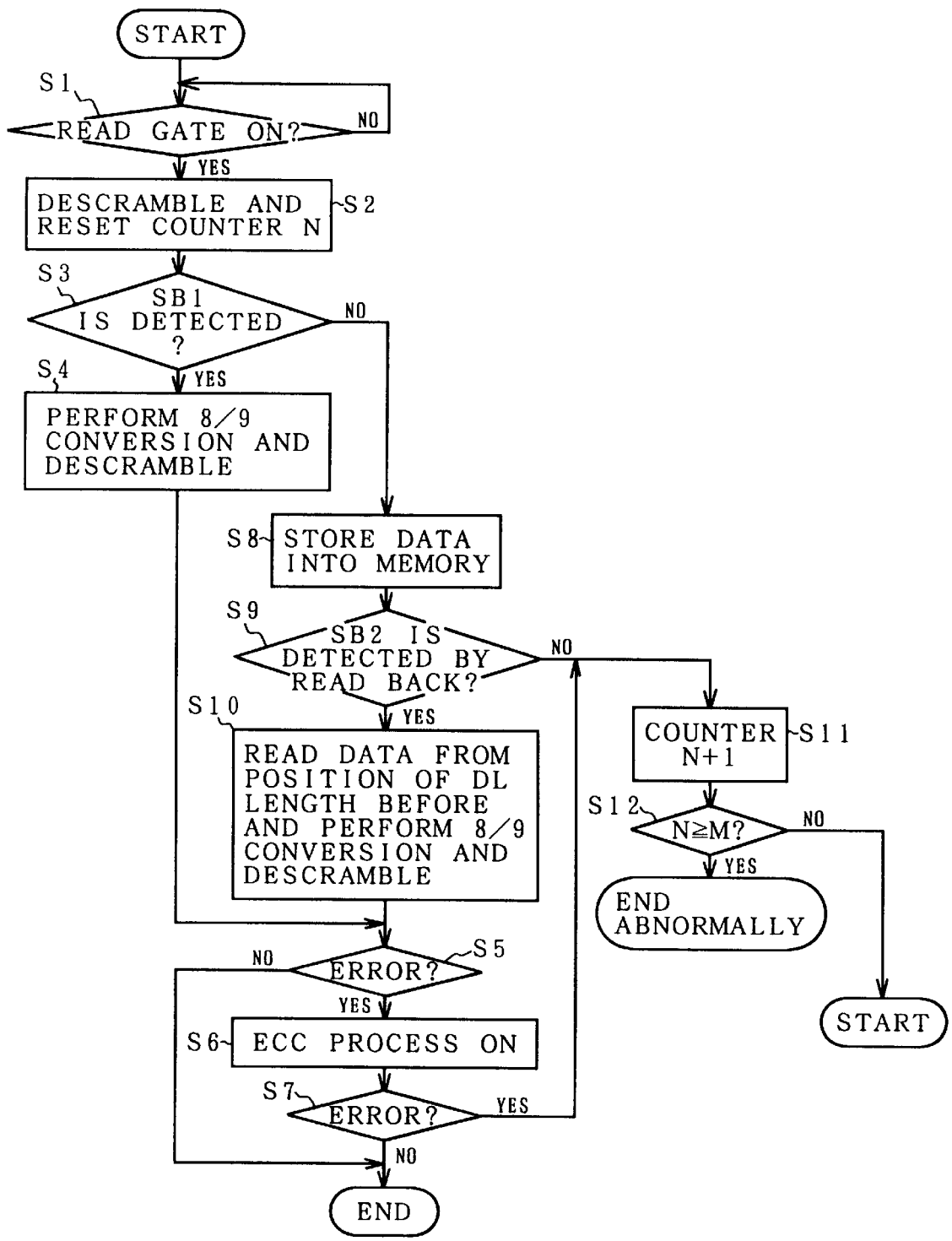
FIG. 7 is a flowchart for the reading process in FIGS. 6A to 6D.

FIG. 7 is a flowchart for the reading operation in FIGS. 6A to 6D. The reading operation relates to an example in the case where since the data and ECC has been scrambled upon writing of the medium, the descrambling process is performed upon reading. If the scrambling process is not performed upon writing to the medium, the process about the descrambling is unnecessary. The reading operation is started from a position where the hard disk controller 22 turns on the read gate for an interval of the first pilot pattern PLO. The read channel 20 discriminates whether the read gate is ON in step S1. If YES, the descrambling process and the resetting process to initialize a counter (N) are first executed in step S2. In step S3, the first sync byte pattern SB1 is detected. When it can be detected, the 8/9 conversion and the descrambling process are executed in step S4. In step S5, an error is checked. If there is an error, an ECC process is turned on and the data is corrected in step S5. In step S6, no error is confirmed and the reading operation is normally finished. Subsequently, when the first sync byte pattern SB1 is lost, if it is determined in step S7 that the read gate is ON, the data is recorded into the memory 126 in step S8. The recording of the data to the memory 126 is actually started when the read gate is turned on in step S3 or after the elapse of a predetermined time from that time. In step S9, the second sync byte pattern SB2 is discriminated by reading back the data recorded in the memory 126. When the second sync byte pattern SB2 is detected, step S10 follows and the byte boundary is set. After that, the data in the memory 126 is read out from the position that is preceding by only the DL length. The data is demodulated by the 8/9 conversion and the descrambling process. The processing routine advances to step S5 and the error is discriminated. In this case, the first sync byte pattern SB1 has been lost. When this influence also has already been exerted on the data, an error is detected. The error is corrected by turning on the ECC process in step S6. When the absence of error is confirmed in step S7, the reading operation is normally finished. Further, when both of the first sync byte pattern SB1 and the second sync byte pattern SB2 are lost, the second sync byte pattern SB2 cannot be detected by the back reading operation in step S9. Therefore, a count value (N) of the counter is increased by 1 (N→N+1) in step S11. In step S12, a check is made to see if the number of retrying times is equal to a predetermined number. When (N) is less than the predetermined number of times, the processing routine is returned to START. The processes are restarted from the timing when the hard disk controller 22 turns on the read gate by the pilot pattern. When the pattern cannot be read out even when the number of times of the reading operation reaches the predetermined number (M) of times, the processing routine is finished as abnormality.

FIGS. 8A to 8D are time charts when reading another medium data format in the magnetic disk apparatus of the invention. The embodiment is characterized in that the training pattern TR which is used for the control of the automatic equalizer of the automatic equalizing type maximum likelihood detecting circuit 76 provided for the read channel 20 in FIG. 4 is eliminated. That is, the embodiment relates to a case where, for example, a fixed value adjusted at the time of shipping from a factory is used as an automatic equalizing type maximum likelihood detecting circuit 76 of the read channel 20 in FIG. 4. Therefore, there is no need to automatically set the tap coefficient by the training signal at the time of reading the disk medium. Thus, the first training field 104 in FIG. 6A is eliminated from the medium data format in FIG. 8A and the first training pattern TR is not recorded. The other format construction is the same as that in FIG. 6A.

FIG. 9 shows a specific pattern of each field written by the medium data format without training in FIG. 8A. In a manner similar to the pattern with training in FIG. 4, the pattern is divided into "HDCIF" as a pattern on the interface with the hard disk controller and "MEDIA" as a pattern on the disk medium and is shown as a pattern C. The pattern C is a pattern in which the training pattern TR is eliminated from a pattern B in FIG. 4. Data lengths of the pilot pattern and data DATA are the same as those in FIG. 4. Further, although the first sync byte pattern SB1 consists of one byte, in order to provide a redundancy for detection of a sync byte pattern, it can be also set within a range of 1 to 6 bytes.

Referring again to FIGS. 8A to 8D, FIGS. 8B and 8C show the read gate signal 82 and read data at the time of the normal reading and they are fundamentally the same as those in the case with the training pattern in FIGS. 6B and 6C. FIG. 8D shows the read data when the first sync byte pattern SB1 is lost and is the same as FIG. 6D.

[Data Split]

The magnetic disk apparatus of the invention uses a data surface servo system in which a servo pattern is arranged in the radial direction every predetermined rotational angle of the data surface of the disk medium. Therefore, when writing as shown in FIGS. 3A to 3C, if the servo region exists in the middle of the write sector region, a format of a data split in which the write data is split into two data and written is used.

Figure 10:
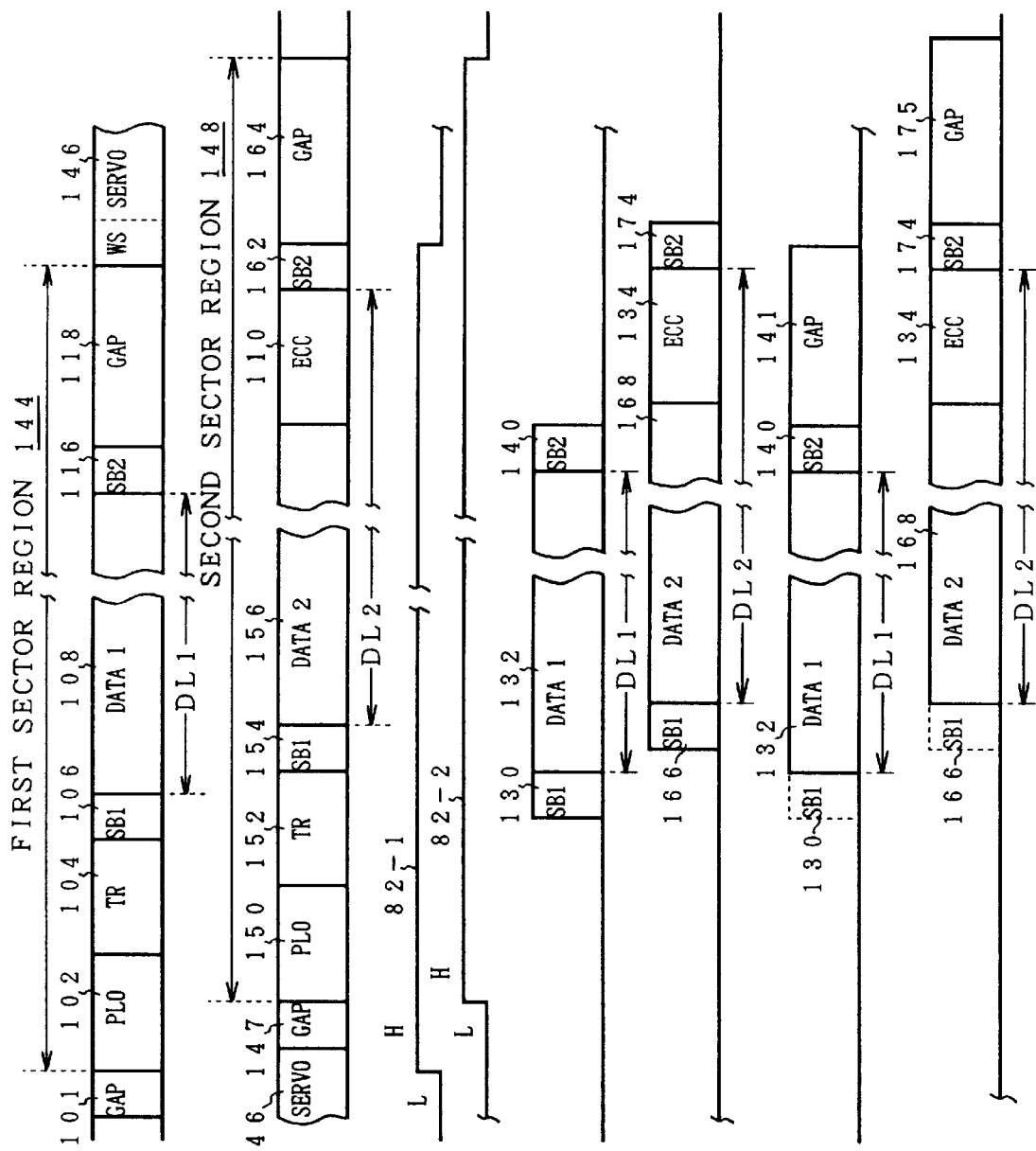
FIGS. 10A to 10E show a medium data format of a data split and time charts for the reading process at the time of normal and loss of SB1.

FIG. 10A shows a split format of the medium data. The write sector is split into two regions of a first sector region 144 and a second sector region 148 before and after a servo field 146 are written. According to the invention, a format in which sync byte patterns are arranged to the head and end of the data portion is applied to each of the first and second sector regions 144 and 148 which were split. That is, as for the first sector region 144 before the servo field 146, the gap field 101, pilot field 102, training field 104, sync byte field 106, data field 108, second sync byte field 116, and gap field 118 are provided. As for the second sector region 148 of the latter half subsequent to the servo field 146 as well, a gap field 147, a pilot field 150, a training field 152, a first sync byte field 154, a second data field 156, a second sync byte field 162, and a gap field 164 are provided. The pilot pattern PL0, training pattern TR, sync byte pattern SB1, and second sync byte pattern SB2 excluding the data field are stored in each field of the first and second sector regions 144 and 148. With regard to the write data, it is divided into former and latter write data by the split by the servo field 146. First split data DATA1 of the data length DL1 which was split is written into the data field 108. Second split data DATA2 which was split and the ECC are written in the data length DL2 in which the ECC 110 is added to the data field 156. Since the sector to be split by the servo pattern has been predetermined, the data length DL1 of the first split data DATA1 and the data length DL2 of the second split data DATA2 including the ECC are also predetermined.

FIGS. 10B and 10C show the read gate signal and read data at the time of normal reading in the split medium data format in FIG. 10A. The read gate signal of FIG. 10B is divided into a read gate signal 82-1 which is set to the H level by the reading of the former half first sector region 144 before the servo field 146 and a read gate signal 82-2 which is set to the H level at a timing of the second sector region 148 after the servo field 146. The read channel 20 operates in each of the read gate signals 82-1 and 82-2 which are generated at timings before and after the servo field 146. As shown in FIG. 10C, as read data of the former half first sector region 144, on the basis of the read data 130 of the first sync byte pattern SB1, the read data 132 of the first split data DATA1 having the data length DL1 is demodulated. In a manner similar to the above, with respect to the latter half second sector region 148 as well, on the basis of the turn-on to the H level of the read gate signal 82-2, when the first sync byte pattern SB1 is detected from read data 166, the second split data DATA2 and the ECC having the data length DL2 are demodulated from read data 168 and 134.

FIG. 10D relates to a case where with respect to the split format of the medium data in FIG. 10A, the first sync byte pattern SB1 is lost in the first sector region 144 before the servo field 146. In this case, as shown in FIG. 10B, as for the read gate signals, the read gate signals 82-1 and 82-2 are turned on to the H level in correspondence to the first sector region 144 and second sector region 148 and the reading operation of the read channel 20 is executed. When the read gate signal 82-1 is turned on in correspondence to the first sector region 144, the hard disk controller 22 in FIG. 1 starts to synchronize with the signal of the pilot pattern PL0 by the built-in data PLL and completes the pull-in until a timing before the training pattern TR is detected. When the pull-in is completed, the recording of up to the serial data DATA1, second sync byte pattern SB2, and gap pattern GAP demodulated in the maximum likelihood detecting circuit 76 into the memory 126 in FIG. 5 is started. The recording operation is continued until the hard disk controller 22 turns off the read gate signal 82-1. Subsequently, the hard disk controller 22 turns on the read gate signal 82-2 in correspondence to the second sector region 148, starts to synchronize with the signal of the pilot pattern PL0 by the built-in data PLL, and completes the pull-in until a timing before the training pattern TR is detected. When the pull-in is completed, the recording of up to the serial data DATA2, ECC, second sync byte pattern SB2, and gap pattern GAP which were demodulated by the maximum likelihood detecting circuit 76 into the memory 126 in FIG. 5 is started. The recording operation is continued until the hard disk controller 22 turns off the read gate signal 82-2. When the read gate signal 82-2 is turned off, in this case, since the first sync byte pattern SB1 in the first sector region 144 is lost, the hard disk controller 22 detects the second sync byte pattern SB2 subsequent to the gap pattern GAP by comparing on a bit unit basis from the direction opposite to the writing direction into the memory 126. When the second sync byte pattern SB2 can be detected, the position is shifted ahead by a length corresponding to only the number of DL1 bytes by the data length DL1. The data DATA1 at this position is read out from the memory 126 and is subjected to the 8/9 conversion and descrambling process by the 8/9 decoder 78. Further, by making the ECC circuit 25 operative, even if the first sync byte pattern SB1 in the first sector region 144 cannot be demodulated, the data is demodulated and the reading operation can be normally finished. As for the second sector region 148, since the first sync byte pattern SB1 has normally been detected, there is no need to perform the reading operation of the memory 126.

FIG. 10E relates to the case where the first sync byte pattern SB1 is lost in the latter half second sector region 148 and the recording of the demodulated data into the memory 126 based on the turn-on of the read gate signals 82-1 and 82-2 is the same as the case of the first sector region 144. However, in the case where the second sync byte pattern SB2 by the back reading is detected, the position is shifted ahead by a length corresponding to only the number of DL2 bytes by the total data length DL2 of the data DATA2 and the ECC. The data DATA2 and the ECC at this position are read out from the memory 126 and are subjected to the 8/9 conversion and the descrambling process by the 8/9 decoder 78. Further, by making the ECC circuit 25 operative, even if the first sync byte pattern SB1 in the second sector region 148 cannot be demodulated, the data is demodulated and the reading operation can be normally finished.

Figure 11:
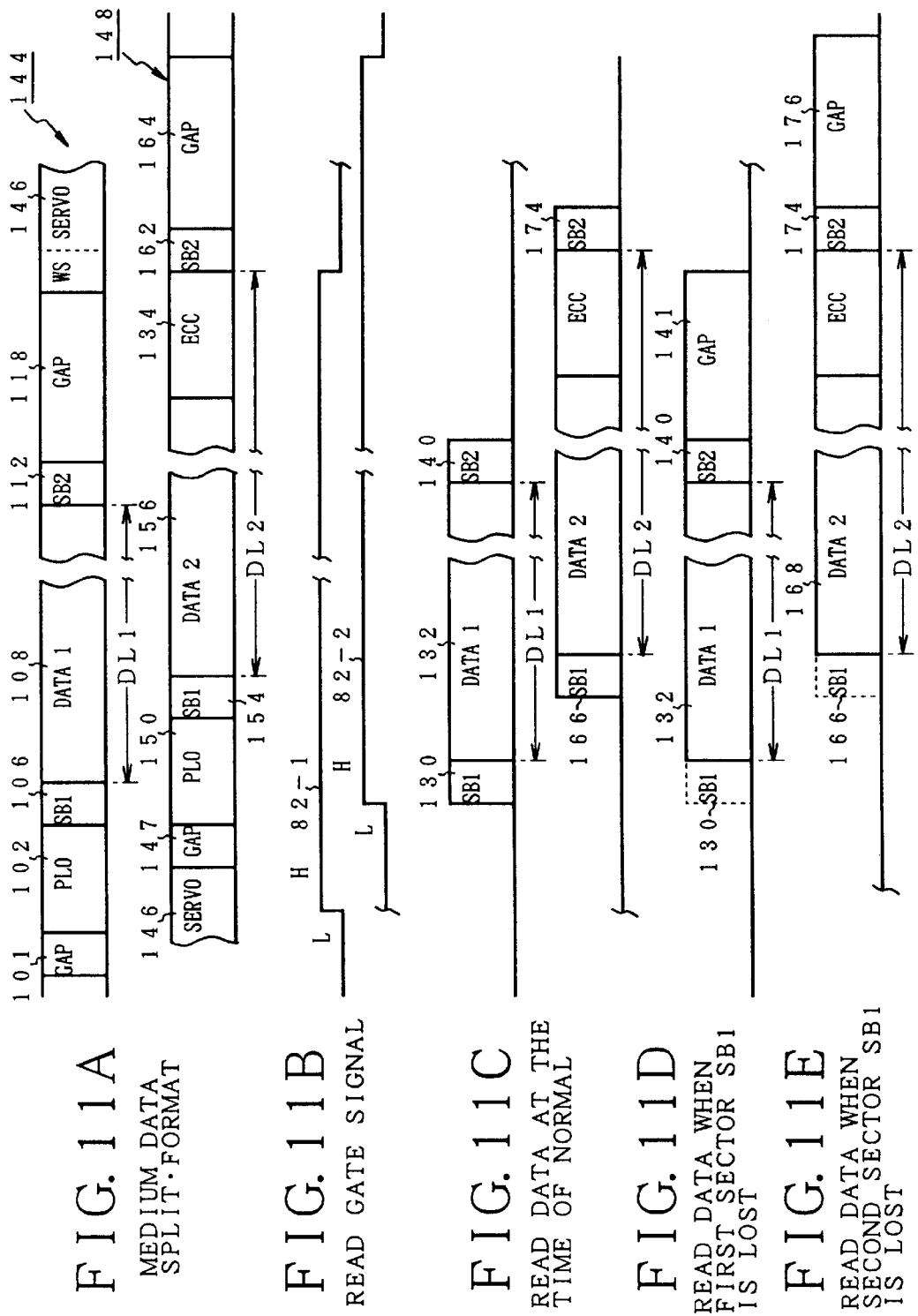
FIGS. 11A to 11E show a data split medium format without training and time charts for the reading process at the time of normal and loss of SB1.

FIGS. 11A to 11E are time charts for normal reading in the case where the data split by the servo field occurs with respect to the medium data format without training pattern. FIG. 11A shows a split format of the medium data without training pattern and relates to a format in which the recording field of the first training pattern TR is eliminated from FIG. 10A. FIG. 11B shows the read gate signals 82-1 and 82-2 at the time of normal reading, so that fourth data DATA4 and, further, the ECC can be reconstructed from the first data DATA1 by the read data at the time of normal as shown in FIG. 11C. FIG. 11D relates to the former half read data in the case where the first sync byte pattern SB1 is lost in the former half first sector region 144 in the split format of the medium data without training pattern. FIG. 11E relates to the latter half read data in the case where the first sync byte pattern SB1 is lost in the latter half first sector region 148 in the split format of the medium data without training pattern. FIGS. 11D and 11E correspond to FIGS. 10D and 10E, respectively. Further, when both of the first and second sync byte patterns SB1 and SB2 are lost in either the first sector region 144 or the second sector region 148 with respect to FIGS. 10A to 10E and FIGS. 11A to 11E, the retrying operation is performed.

[Scramble and Descramble]

Figure 12:
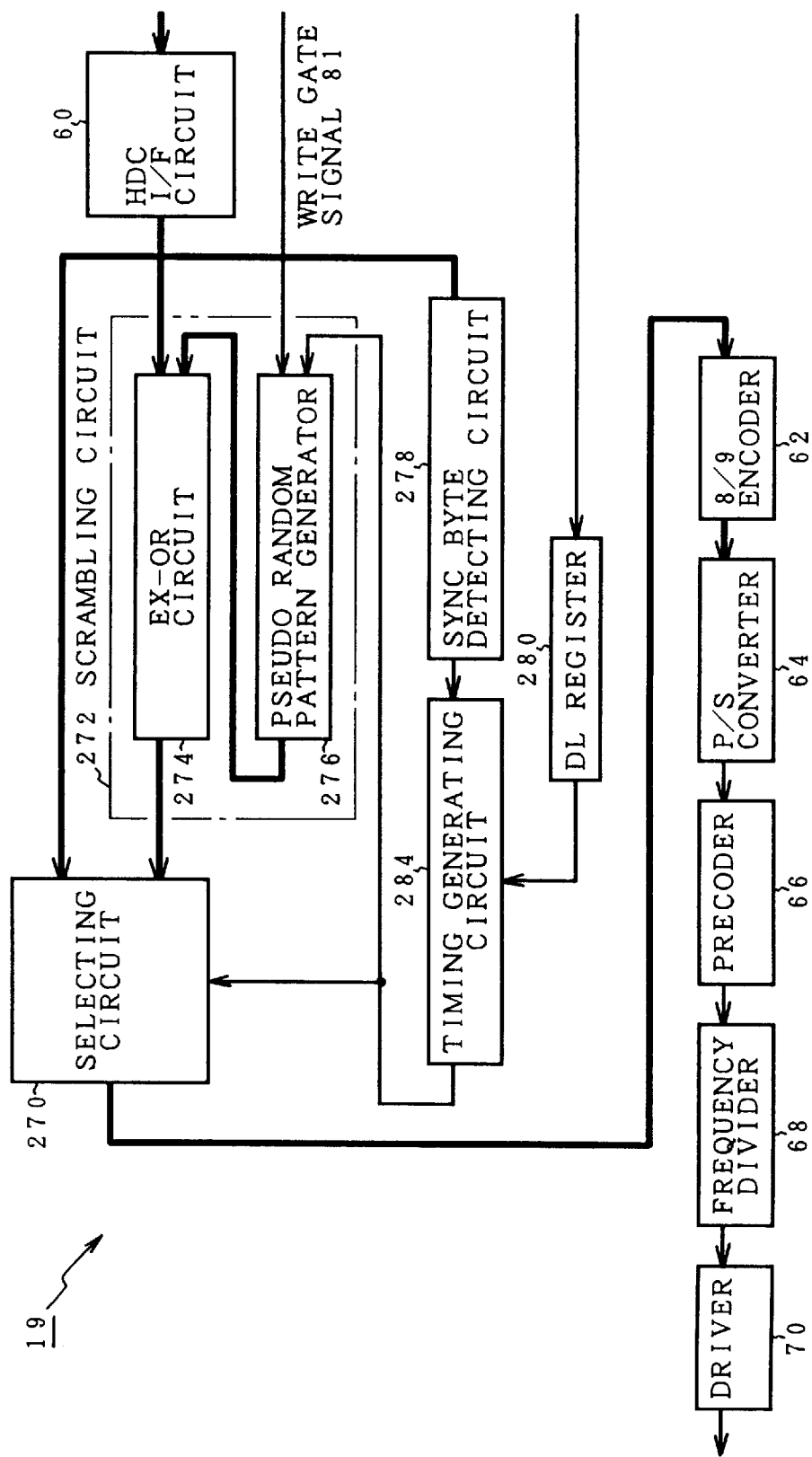
FIG. 12 is a block diagram of the write channel in FIG. 1 in case of scrambling write data.

FIG. 12 shows another embodiment of the write channel 19 in FIG. 1. The embodiment is characterized in that the data, ECC, and gap pattern to be written to the disk medium are scrambled. In a manner similar to the embodiment of FIG. 2, the HDC interface circuit 60 for writing, 8/9 encoder 62, parallel/serial converter 64, precoder 66, frequency divider 68, and driver 70 are provided for the write channel 19. A circuit function to scramble the data, ECC, and gap pattern is provided between the HDC interface circuit 60 for writing and the 8/9 encoder 62. That is, a scrambling circuit 272 is provided subsequently to the HDC interface circuit 60 for writing. The scrambling circuit 272 has an EX-OR circuit 274 and a pseudo random pattern generator 276. The pseudo random pattern generator 276 generates, for example, an (M) series code having a predetermined code length. The EX-OR circuit 274 gets the EX-OR of the formatted data of one sector from the HDC interface circuit 60 for writing and the pseudo random pattern, thereby scrambling. Subsequent to the scrambling circuit 272, a selecting circuit 270 is provided. The data from the HDC interface circuit 60 for writing and the data scrambled by the scrambling circuit 272 are inputted to the selecting circuit 270. Either one of the data is selected and inputted to the 8/9 encoder 62. The selecting circuit 270 selects the data which was scrambled by the scrambling circuit 272 at the timings of the write data, ECC, and gap pattern and selects the data from the HDC interface circuit 60 for writing, namely, the data that is not scrambled in the other timings. The selection of the selecting circuit 270 and the pattern generation of the pseudo random pattern generator 276 are controlled by a timing generating circuit 284. A sync byte detecting circuit 278 and a DL register 280 are provided for the timing generating circuit 284. The sync byte detecting circuit 278 detects and outputs the first and second sync byte patterns SB1 and SB2 included in the formatted write data derived from the HDC interface circuit 60 for writing. The total data length DL of the data DATA and the ECC subsequent to the first sync byte pattern SB1 has been set in the DL register 280. An interval of the data DATA corresponding to the data length DL set in the DL register 280 is set from the timing when the first sync byte pattern SB1 is detected by the sync byte detecting circuit 278. In response to it, the timing generating circuit 284 sets a scrambling period of time for the interval of the data DATA and the ECC. The timing signal indicative of the timing of the data and the ECC which are scrambled due to the timing generating circuit 284 is also supplied to the pseudo random pattern generator 276. The pseudo random pattern is generated from the pseudo random pattern generator 276 to the EX-OR circuit 274 synchronously with the output selection from the scrambling circuit 272 of the selecting circuit 270, thereby enabling the scrambled data to be supplied to the selecting circuit 270.

FIGS. 13A to 13E are time charts for the scrambling process of the write channel 19 in FIG. 12. First, when the write gate signal 81 in FIG. 13A is turned on, the pseudo random pattern generator 276 of the scrambling circuit 272 enters an operable state. In this state, the write data according to the HDC data format as shown in FIG. 13B is inputted to the write channel 19 through the HDC interface circuit 60 for writing. The first sync byte detecting circuit 278 detects the first sync byte pattern 88 shown by SB1 and generates a detection signal to the timing generating circuit 284. In response to it, the timing generating circuit 284 generates a timing signal for the data length DL set in the DL register 280 to the selecting circuit 270, thereby allowing the output of the scrambling circuit 272 to be selected. Since the timing signal is supplied to the pseudo random pattern generator 276, a scrambling signal 288 in FIG. 13D is generated, so that the data DATA 90 and ECC 92 to the EX-OR circuit 274 are scrambled.

Figure 14:
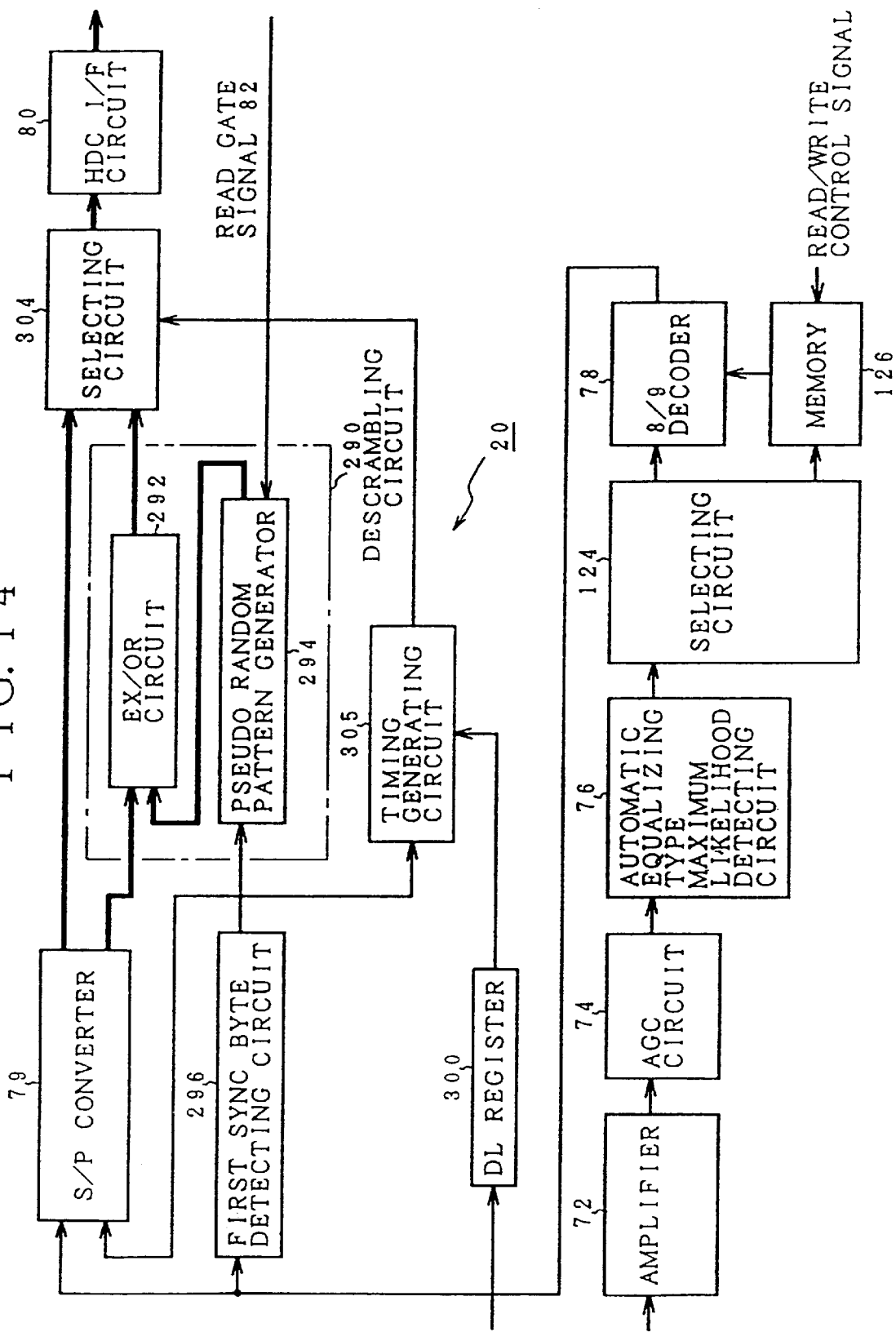
FIG. 14 is a block diagram of the read channel in FIG. 1 in case of descrambling read data.

FIG. 14 is a block diagram of the embodiment having the descrambling function of the read channel 20 in FIG. 1 corresponding to the write channel 19 having the scrambling function in FIG. 12. The read channel 20 has the amplifier 72, AGC circuit 74, automatic equalizing type maximum likelihood detecting circuit 76, 8/9 decoder 78, serial/parallel converter 79, and HDC interface circuit 80 for reading in FIG. 4. The selecting circuit 124 and memory 126 are provided between the automatic equalizing type maximum likelihood detecting circuit 76 and 8/9 decoder 78 for an error recovery in the case where the sync byte pattern is lost due to the thermal asperity of the MR head. Further, a descrambling circuit 290 and a selecting circuit 304 are provided between the serial/parallel converter 79 and HDC interface circuit 80 for reading in order to descramble. An EX-OR circuit 292 and a pseudo random pattern generator 294 are provided for the descrambling circuit 290 and this structure is the same as the scrambling circuit 272 in FIG. 12. The selection of the selecting circuit 304 is controlled by a timing generating circuit 305. That is, by selecting an output of the descrambling circuit 290 at the timings of the data DATA and the ECC included in the read data, the descrambling is performed. By directly selecting the output of the serial/parallel converter 79 at the other timings, the descrambling is cancelled. A sync byte detecting circuit 296 is provided to control the serial/parallel converter 79, pseudo random pattern generator 294, and timing generating circuit 305. Further, a DL register 300 in which the total data length DL of the data DATA and the ECC has been stored is provided to control the timing generating circuit 305.

FIGS. 15A to 15F are time charts for the processing operation of the read channel 20 having the descrambling function in FIG. 14. It is now assumed that the reading operation of the medium format as shown in FIG. 15A was performed. With respect to each of the data DATA in the data field 108 and the ECC in the ECC field 100, as shown in the time charts of FIGS. 13D and 13E, they have been scrambled at the time of writing. When the reading operation is executed, as shown in FIG. 15B, the read gate signal 82 is set to the H level by the detection of the pilot pattern PL0. In this state, when the first sync byte pattern SB1 is detected by the first sync byte detecting circuit 296, the timing generating circuit 305 generates a timing signal 308 for the data length DL of the data DATA and the ECC which was set in the DL register 300 as shown in FIG. 15C. When the timing signal 308 is stopped, the pseudo random pattern generator 294 is reset. In response to the timing signal 308, the selecting circuit 304 selects the output from the descrambling circuit 290. The sync byte detection signal is supplied to the serial/parallel converter 79 and the serial read data of the data DATA is converted into the parallel data from the detection timing of the first sync byte pattern SB1. In this instance, the pseudo random pattern generator 294 generates the pseudo random pattern which coincides with the bit width of the parallel conversion to the EX-OR circuit 292. The descrambling is performed by getting the EX-OR of the pseudo random pattern and the parallel data, thereby reconstructing the original NRZ data. The descrambled data is outputted to the hard disk controller 22 through the selecting circuit 304 and HDC interface circuit 80 for writing. The descrambling circuit 290 is reset here. FIG. 15F relates to the case where the first sync byte pattern SB1 is lost. In this case as well, the read data 132 and 134 of the data DATA and the ECC are descrambled in a manner similar to the normal case in FIG. 15E.

According to the invention as mentioned above, in addition to the sync byte pattern at the head of the data portion, by also arranging the sync byte pattern to the end of the data portion, even if the head sync byte pattern is lost by the thermal asperity of the MR head with the medium, the sector data can be demodulated on the basis of the last sync byte pattern of the data portion. Therefore, a situation such that the sector data is perfectly lost can be prevented. A situation such that an unrecovery error is caused by the loss of the sync byte due to the thermal asperity of the MR head can be prevented.

Although the defect by the thermal asperity of the MR head occurs at random at the user using stage and grows as a sector defect, when the sector data demodulation is normally finished on the basis of the detection of the sync byte at the end of the data portion of the invention, the sector is regarded as a defective sector after the demodulation was normally finished. The alternating process to register the sector data into the alternating sector is performed. Thus, the defective sector due to the thermal asperity of the MR head can be substantially recovered. The growth of the defective sector due to the thermal asperity of the MR head at the user using stage can be certainly prevented.

Further, even with respect to the case where the write data is split by the servo pattern by the writing in the data surface servo system, by arranging the sync byte patterns to the positions before and after the data portion with regard to the split sector regions, as for each of the divided sector regions which were subjected to the data split, the reading operation can be normally finished without causing the unrecovery error for the defect of the sync byte pattern due to the thermal asperity of the MR head.

The present invention is not limited to the foregoing embodiment but various modifications are possible so long as a format in which the sync byte patterns are arranged at positions before and after the data portion. The invention is not limited by the numerical values shown in the embodiment.

What is claimed is:

1. A magnetic disk apparatus for writing and reading information to/from tracks of a medium on a sector unit basis by using a head having a write head and a read head, comprising:

a writing unit constructed in a manner such that when data including an error detection correction code is written into a sector region, a first sync byte pattern is written to the head of said data and a second sync byte pattern is written to the end of said data; and a reading unit constructed in a manner such that read data read out from said sector region is written into a memory in parallel with a demodulation of the data by a demodulating unit, and when said first sync byte pattern cannot be detected from said demodulation data, the data stored in said memory is read back from an end gap side, said second sync byte pattern is detected, data of a predetermined length preceding said second sync byte pattern is read out from said memory, and said memory read-out is demodulated in said demodulating unit.

2. An apparatus according to claim 1, wherein said writing unit writes a training pattern for automatically adjusting a circuit constant of an automatic equalizer to an optimum value to a position before each of said first and second sync byte patterns.

3. An apparatus according to claim 1, wherein said writing unit writes a pilot pattern for synchronizing a clock generating circuit provided for said reading unit with a read signal to a position before each of said first and second sync byte patterns.

4. An apparatus according to claim 1, wherein:

said writing unit has a scrambling circuit for scrambling each of said data and said error detection correction code which are written to said medium by using a predetermined pseudo random code; and said reading unit has a descrambling circuit for descrambling each of said data and said error detection correction code which were read out from said medium by using said pseudo random code.

5. An apparatus according to claim 1, wherein said reading unit executes a reading process again when both of said first and second sync byte patterns cannot be detected.

6. An apparatus according to claim 1, wherein when said first sync byte pattern cannot be detected, after a reading process was normally finished, said reading unit determines that said read sector is a defective sector and executes an alternating process.

7. An apparatus according to claim 1, wherein:

said writing unit is constructed in a manner such that in the case where a servo region has previously been recorded in the middle of the sector region of said medium to be written, said sector region is split into two regions of a first sector region before said servo region and a second sector region after said servo region, said write data is split into two data portions of first split data in said first sector region and second split data in said second sector region, said first sync byte pattern, said first split data, and said second sync byte pattern are sequentially written into said first sector region, and said first sync byte pattern, said second split data, and said second sync byte pattern are sequentially written into said second sector region.

8. An apparatus according to claim 7, wherein said writing unit writes a training pattern for automatically adjusting a circuit constant of an automatic equalizer provided for said reading unit to an optimum value to a position before each of said first and second sync byte patterns.

9. An apparatus according to claim 7, wherein said writing unit writes a pilot pattern for synchronizing a clock generating circuit provided for said reading unit with a read signal to a position before each of said first and second sync byte patterns.

10. An apparatus according to claim 7, wherein:

said writing unit has a scrambling circuit for scrambling each of said first and second split data which are written to said medium by using a predetermined pseudo random code; and said reading unit has a descrambling circuit for descrambling each of said first and second split data which were read out from said medium by using said pseudo random code.

11. An apparatus according to claim 7, wherein both of said first and second sync byte patterns in said first sector region or both of said first and second sync byte patterns in said second sector region cannot be detected, said reading unit executes a reading process again.

12. An apparatus according to claim 7, wherein when said first sync byte pattern in said first or second sector region cannot be detected, after a reading process was normally finished, said reading unit determines that said read split sector is a defective sector and executes an alternating process.

13. A magnetic disk apparatus for writing and reading information to/from tracks of a medium on a sector unit basis by using a head having a write head and a read head in which each of said sectors is mutually separated by a gap provided at each of a sector head and a sector end, comprising:

a reading unit constructed in a manner such that read data read out from said sector region is written into a memory in parallel with a demodulation of the data by a demodulating unit, and when said first sync byte pattern cannot be detected from said demodulation data, the data stored in said memory is read back from an end gap side, said second sync byte pattern is detected, data of a predetermined length preceding said second sync byte pattern is read out from said memory, and said memory read-out is demodulated in said demodulating unit.

* * * * *